(12) United States Patent
Jain et al.

(10) Patent No.: US 8,107,469 B2
(45) Date of Patent: Jan. 31, 2012

(54) ENABLING ROUTING OF DATA ON A NETWORK BASED ON A PORTION OF DATA ACCESSED FROM A NON-NETWORK ENABLED DEVICE

(75) Inventors: Manoj K. Jain, Hyderabad (IN);
Srinivasulu Grandhi, Hyderabad (IN);
Ananda Sarkar, West Bengal (IN)

(73) Assignee: Microsoft Corporation, Redmond, WA (US)

(*) Notice: Subject to any disclaimer, the term of this patent is extended or adjusted under 35 U.S.C. 154(b) by 328 days.

(21) Appl. No.: 11/724,383

(22) Filed: Mar. 15, 2007

(65) Prior Publication Data

US 2008/0225827 A1 Sep. 18, 2008

(51) Int. Cl.
*H04L 12/18* (2006.01)
*H04L 12/56* (2006.01)

(52) U.S. Cl. ........................................ 370/389
(58) Field of Classification Search ............. None
See application file for complete search history.

(56) References Cited

U.S. PATENT DOCUMENTS

| | | | |
|---|---|---|---|
| 5,115,326 A | 5/1992 | Burgess et al. | |
| 5,175,684 A | 12/1992 | Chong | |
| 5,404,231 A | 4/1995 | Bloomfield | |
| 5,461,488 A * | 10/1995 | Witek ..................... | 358/402 |
| 5,659,164 A | 8/1997 | Schmid et al. | |
| 5,764,866 A | 6/1998 | Maniwa | |
| 5,870,549 A | 2/1999 | Bobo, II | |
| 5,920,404 A | 7/1999 | Weiser | |
| 6,094,689 A | 7/2000 | Embry et al. | |
| 6,104,500 A | 8/2000 | Alam et al. | |
| 6,134,595 A | 10/2000 | Huang et al. | |
| 6,160,796 A | 12/2000 | Zou | |
| 6,208,904 B1 | 3/2001 | Mullen, Jr. | |
| 6,350,066 B1 | 2/2002 | Bobo, II | |
| 6,353,848 B1 | 3/2002 | Morris | |
| 6,400,729 B1 | 6/2002 | Shimadoi et al. | |
| 6,421,742 B1 | 7/2002 | Tillier | |
| 6,425,001 B2 | 7/2002 | Lo et al. | |

(Continued)

FOREIGN PATENT DOCUMENTS

EP 1542396 A1 6/2005

(Continued)

OTHER PUBLICATIONS

"Capturix ScanShare 1.10.125", Retrieved: Jan. 5, 2007; http://www.brothersoft.com/dvd_video/media_management/capturix_scanshare_39008.html.

(Continued)

*Primary Examiner* — Chirag Shah
*Assistant Examiner* — Minh-Trang Nguyen

(57) ABSTRACT

A system and method for enabling routing of data on a network based on a portion of data accessed from a non-network enabled device is disclosed. The technology includes a method for enabling routing of data on a network based on a portion of data accessed from a non-network enabled device. The method includes detecting a non-network enabled device locally coupled to a first computer system, the first computer system coupled to the network. The method further includes enabling routing of data through the non-network enabled device to a second computer system coupled to the network by using the first computer system as a communication interface between the non-network enabled device and the second computer system wherein the second computer system is automatically identified based on recognizing a portion of the data as a routing destination.

20 Claims, 8 Drawing Sheets

U.S. PATENT DOCUMENTS

| | | | | |
|---|---|---|---|---|
| 6,426,806 | B2* | 7/2002 | Melen | 358/468 |
| 6,429,952 | B1* | 8/2002 | Olbricht | 358/442 |
| 6,519,051 | B1 | 2/2003 | Wu et al. | |
| 6,529,286 | B1 | 3/2003 | King | |
| 6,603,569 | B1 | 8/2003 | Johnson, Jr. et al. | |
| 6,650,432 | B1 | 11/2003 | Hsu et al. | |
| 6,967,972 | B1 | 11/2005 | Voftsun et al. | |
| 6,980,331 | B1 | 12/2005 | Mooney et al. | |
| 6,996,235 | B2 | 2/2006 | Foth | |
| 7,058,055 | B2 | 6/2006 | Mugica et al. | |
| 7,072,473 | B2 | 7/2006 | Foth | |
| 7,106,464 | B1 | 9/2006 | Brylov | |
| 7,110,135 | B2 | 9/2006 | Karaoguz et al. | |
| 7,139,094 | B2 | 11/2006 | Blasio et al. | |
| 7,152,110 | B2 | 12/2006 | Pierce | |
| 7,154,622 | B2 | 12/2006 | Constantin et al. | |
| 7,184,169 | B2 | 2/2007 | Kropf et al. | |
| 7,409,569 | B2 | 8/2008 | Illowsky et al. | |
| 7,483,179 | B2 | 1/2009 | Stumbo et al. | |
| 2001/0014908 | A1* | 8/2001 | Lo et al. | 709/203 |
| 2002/0002609 | A1* | 1/2002 | Chung et al. | 709/223 |
| 2002/0143966 | A1 | 10/2002 | Sibecas et al. | |
| 2002/0181804 | A1 | 12/2002 | Simpson et al. | |
| 2003/0048303 | A1 | 3/2003 | Mesa et al. | |
| 2003/0074179 | A1 | 4/2003 | Ropo et al. | |
| 2003/0101289 | A1 | 5/2003 | Alikerov et al. | |
| 2003/0181804 | A1 | 9/2003 | Gagnon et al. | |
| 2003/0236890 | A1 | 12/2003 | Hurwitz et al. | |
| 2004/0148436 | A1* | 7/2004 | Notsu | 709/246 |
| 2004/0178128 | A1 | 9/2004 | O'Connell et al. | |
| 2004/0218226 | A1 | 11/2004 | Antognini et al. | |
| 2005/0071746 | A1 | 3/2005 | Hart et al. | |
| 2005/0091666 | A1* | 4/2005 | Wilkinson et al. | 719/323 |
| 2005/0125576 | A1* | 6/2005 | Yashiki et al. | 710/62 |
| 2005/0198558 | A1* | 9/2005 | Chrisop et al. | 715/500 |
| 2005/0242168 | A1* | 11/2005 | Tesavis et al. | 235/375 |
| 2006/0072144 | A1 | 4/2006 | Dowling et al. | |
| 2006/0155802 | A1 | 7/2006 | He et al. | |
| 2006/0248191 | A1 | 11/2006 | Hudson et al. | |
| 2006/0256392 | A1 | 11/2006 | Van Hoof et al. | |
| 2007/0133839 | A1* | 6/2007 | Muller et al. | 382/100 |
| 2007/0153326 | A1 | 7/2007 | Kim | |
| 2008/0098405 | A1 | 4/2008 | Kumar et al. | |

FOREIGN PATENT DOCUMENTS

| | | |
|---|---|---|
| WO | 2006080026 A1 | 8/2006 |
| WO | 2008112718 A1 | 9/2008 |

OTHER PUBLICATIONS

"Document Capture Solutions", Retrieved: Jan. 5, 2007; http://www.hp.com/large/ipg/docmanage/doc_capture.html.

Non-Final Office Action in related U.S. Appl. No. 11/724,385 dated Jun. 1, 2009.

Final Office Action in related U.S. Appl. No. 11/724,385 date Dec. 24, 2009.

Non-Final Office Action in related U.S. Appl. No. 11/724,619 dated Oct. 7, 2009.

Fensel, et al. "The Web Modeling Framework WSMF", 2001; http://www1-c703.uibk.ac.at/~c70385/wese/wsmf.paper.pdf.

McKnight, et al., "Towards a Sharing Protocol for Wireless Grids", Date: May 28, 2003, http://wirelessgrids.net/docs/CCCT03_McKnight_T823HO.pdf.

McKnight, et al. "Wireless Grids Distributed Resource Sharing by Mobile, Nomadic, and Fixed Devices", Date: Jul./Aug. 2004; http://wirelessgrids.net/docs/WP6McKnightHowison.RTF.

"BlindScanner 1.14", Retrieved: Jan. 5, 2007; http://www.sharewareplaza.com/BlindScanner-download__36436.html.

"Laserfiche Remote Scanning Plug-In", Retrieved: Jan. 5, 2007; http://www.laserfiche.com/products/addons/remotescanning.html.

"RemoteScan for TS/CX allows any user in a Terminal Services or Citrix environment to scan directly into hosted applications", Retrieved: Jan. 5, 2007; http://www.remote-scan.com/share-scanner-diagram.php.

Non-Final Office Action in related U.S. Appl. No. 11/724,537 dated Sep. 8, 2009.

International Search Report from related PCT Application No. PCT/US2008/056577 dated Aug. 13, 2008.

Communication cited in related European Application No. 08731940.6-1243 dated Oct. 29, 2009.

Non-final Office Action cited in related U.S. Appl. No. 11/724,619 dated Apr. 16, 2009.

Non-final Office Action cited in related U.S. Appl. No. 11/724,385 dated Mar. 17, 2010.

Non-final Office Action cited in related U.S. Appl. No. 11/724,537 dated Mar. 9, 2010.

"Relay Fax", Retrieved: Jan. 5, 2007; http://www.altn.com/products/default.asp/product_id/RelayFax.

"Strobe XP470 600×1200 document Scanner", Retrieved: Jan. 5, 2007; http://www.academicsuperstore.com/market/marketdisp.html?PartNo=742470.

"Visioneer One touch 7300 USB Ultra-Slimline Flatbed Scanner" Retrieved: Jan. 5, 2007; http://www.amazon.com/Visioneer-OneTouch-Ultra-slimline-flatbed-Scanner/dp/B0000DFZ6A.

Bernstein's, Paul, "Chapter 9—Computer Imaging and Scanning", Retrieved: Jan. 5, 2007; http://www.cyberbarassociation.net/cfl/book/chpt9.htm.

Final Office Action cited in related U.S. Appl. No. 11/724,537 dated Sep. 1, 2010.

Non-Final Office Action cited in related U.S. Appl. No. 11/706,504 dated Jun. 2, 2009.

Final Office Action cited in related U.S. Appl. No. 11/724,385 dated Sep. 20, 2010.

Non-Final Office Action cited in related U.S. Appl. No. 11/724,537 dated Nov. 23, 2010.

Final Office Action cited in related U.S. Appl. No. 11/724,537 dated Apr. 28, 2011.

Non-Final Office Action cited in related U.S. Appl. No. 11/724,619 dated Sep. 30, 2010.

Final Office Action cited in related U.S. Appl. No. 11/724,619 dated Mar. 16, 2011.

International Preliminary Report on Patentability cited in related PCT Application No. PCT/US2008/056577 dated Sep. 24, 2009.

Chinese Office Action cited in related Chinese Application No. 200880008113.9 dated Feb. 23, 2011.

* cited by examiner

ENABLING ROUTING OF DATA ON A NETWORK BASED ON A PORTION OF DATA ACCESSED FROM A NON-NETWORK ENABLED DEVICE

BACKGROUND

As electronic technology advances, people are buying more and more different kinds of electronic devices, such as digital televisions, personal; computers, portable media players, cell phones and stereos.

Devices such as scanners and printers are commonly found coupled to computer systems. Scanners allow a user to generate a digital image of a printed or hand written page that can then be manipulated using a graphics editing program. Printers allow a user to generate a printed version or "hard copy" of a digitized file or image.

Generally, devices can be classified into one of two categories. The first category being network-enabled devices and the second category being non-network enabled devices. Network enabled devices can be communicatively coupled to a network while non-network enabled devices can only communicate with a local computer system directly coupled to the device and can not be shared on a network.

The various capabilities of the different kinds of devices can lead to complications with user interaction with these devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A system and method for enabling routing of data on a network based on a portion of data accessed from a non-network enabled device is disclosed. The technology includes a method for enabling routing of data on a network based on a portion of data accessed from a non-network enabled device. The method includes detecting a non-network enabled device locally coupled to a first computer system, the first computer system coupled to the network. The method further includes enabling routing of data through the non-network enabled device to a second computer system coupled to the network by using the first computer system as a communication interface between the non-network enabled device and the second computer system wherein the second computer system is automatically identified based on recognizing a portion of the data as a routing destination.

In order to facilitate enabling routing of data on a network from a non-network enabled device, a device sharing enabler module enables routing of data through a non-network enabled device on a network. The device sharing enabler module includes a device identifier module configured to identify the non-network enabled device locally coupled to a first computer system, wherein the first computer system is coupled to the network. The device sharing enabler module also includes a network enabled device emulator module configured to enable routing of data through the non-network enabled device to a second computer system coupled to the network by using the first computer system as a communication interface between the non-network enabled device and the second computer system wherein the second computer system is automatically identified based on recognizing a portion of the data as a routing destination.

DESCRIPTION OF THE DRAWINGS

The accompanying drawings, which are incorporated in and form a part of this specification, illustrate embodiments of the technology for enabling routing of data on a network based on a portion of data accessed from a non-network enabled device and, together with the description, serve to explain principles discussed below.

Figure 1:
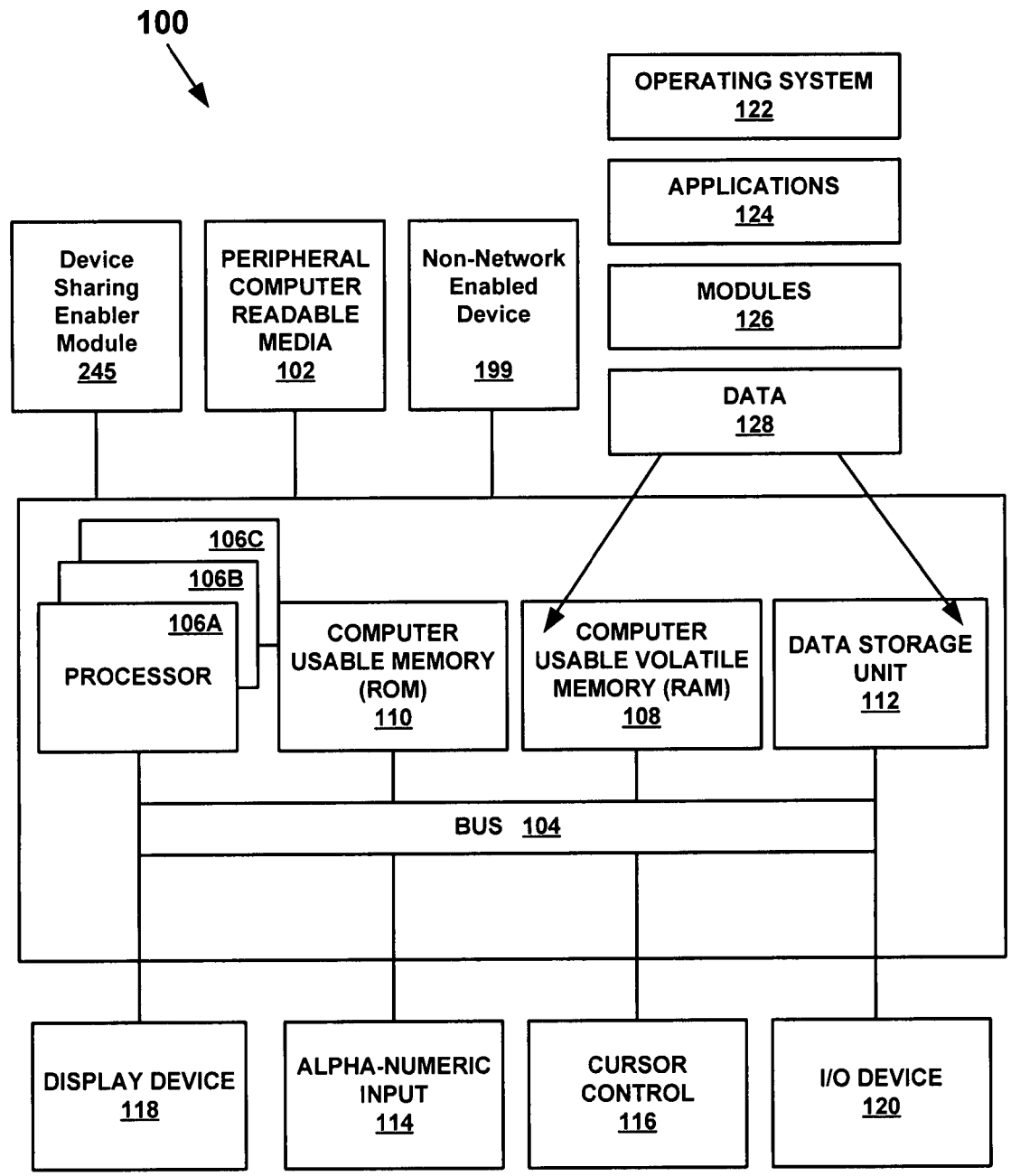
FIG. 1 is a diagram of an exemplary computer system used in accordance with embodiments of the present technology for enabling routing of data on a network based on a portion of data accessed from a non-network enabled device.

The drawings referred to in this description should be understood as not being drawn to scale except if specifically noted.

DETAILED DESCRIPTION

Reference will now be made in detail to embodiments of the present technology for enabling routing of data on a network based on a portion of data accessed from a non-network enabled device, examples of which are illustrated in the accompanying drawings. While the technology for enabling routing of data on a network based on a portion of data accessed from a non-network enabled device will be described in conjunction with various embodiments, it will be understood that they are not intended to limit the present technology for enabling routing of data on a network based on a portion of data accessed from a non-network enabled device to these embodiments. On the contrary, the presented technology for enabling routing of data on a network based on a portion of data accessed from a non-network enabled device is intended to cover alternatives, modifications and equivalents, which may be included within the spirit and scope the various embodiments as defined by the appended claims.

Furthermore, in the following detailed description, numerous specific details are set forth in order to provide a thorough understanding of the present technology for enabling routing of data on a network based on a portion of data accessed from a non-network enabled device. However, the present technology for enabling routing of data on a network based on a portion of data accessed from a non-network enabled device may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "routing", interfacing", "recognizing", "representing", "emulating", "detecting", "exposing", "converting", "authenticating", "communicating", sharing", "receiving", "performing", "generating", "displaying", "enabling", "scrolling", "highlighting", "presenting", "configuring", "identifying", "reporting", "ensuring", "suppressing", "disabling", "ending", "providing", and "accessing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for enabling routing of data on a network based on a portion of data accessed from a non-network enabled device is also well suited to the use of other computer systems such as, for example, optical and mechanical computers.

Example Computer System Environment

With reference now to FIG. 1, portions of the technology for enabling routing of data on a network based on a portion of data accessed from a non-network enabled device are composed of computer-readable and computer-executable instructions that reside, for example, in computer-usable media of a computer system. That is, FIG. 1 illustrates one example of a type of computer that can be used to implement embodiments, which are discussed below, of the present technology for enabling routing of data on a network based on a portion of data accessed from a non-network enabled device.

FIG. 1 illustrates an exemplary computer system 100 used in accordance with embodiments of the present technology for enabling routing of data on a network based on a portion of data accessed from a non-network enabled device. It is appreciated that system 100 of FIG. 1 is exemplary only and that the present technology for enabling routing of data on a network based on a portion of data accessed from a non-network enabled device can operate on or within a number of different computer systems including general purpose networked computer systems, embedded computer systems, routers, switches, server devices, consumer devices, various intermediate devices/artifacts, stand alone computer systems, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C.

System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. 1 may be a liquid crystal device, cathode ray tube, plasma display device or other display device suitable for creating graphic images and alphanumeric characters recognizable to a user. System 100 may also include a non-network enabled device 199. Non-network enabled device 199 can be any type of device, including a scanner device, a printer device, a fax device, or any other peripheral device that is capable of communicatively coupling to system 100.

It is appreciated that the term "non-network enabled device" refers to any device that is not normally capable of being shared on a network. For example, many high end devices are Internet Protocol (IP) enabled, meaning they can be networked and shared and/or directly accessed by a plurality clients on a network. Further descriptions of non-network enabled devices are provided below in conjunction with the description of FIGS. 2-7. In one embodiment of the technology, the non-network enabled device 199 is locally coupled with system 100.

System 100 may also include or be coupled with a device sharing enabler module 245. In one embodiment of the present technology for enabling routing of data on a network based on a portion of data accessed from a non-network enabled device, the device sharing enabler module 245 enables sharing of the non-network enabled device 199 with other systems coupled to a network. In one embodiment, system 100 couples to a network via input/output device 120. In one embodiment, the device sharing enabler module 245 enables routing of data through the non-network enabled device to other systems on a network.

The present technology is well suited for automatically routing data on a network. For example, in the case the non-network enabled device 199 is a scanner, the present technology identifies a destination address from a portion of a scanned document. For example, a header portion on the first page of a scanned document comprises a text description of a destination address on the network and the document is automatically routed to the destination address on the document. In one embodiment, optical character recognition (OCR) is performed on a portion of the document to identify the data routing destination.

Optional cursor control device 116 allows the computer user to dynamically signal the movement of a visible symbol (cursor) on display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands.

System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet. In one embodiment, non-network enabled device 199 is shared with another computer system on a network using system 100 as a communication interface. In one embodiment, the device sharing enabler module enables sharing of non-network enabled device 199 with other computer systems on a network. A more detailed discussion of the present technology for enabling routing of data on a network from a non-network enabled device is found below.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology for enabling routing of data on a network based on a portion of data accessed from a non-network enabled device, for example, is stored as an application 124 or module 126 in memory locations within RAM 108 and memory areas within data storage unit 112.

The computing system 100 is only one example of a suitable computing environment and is not intended to suggest any limitation as to the scope of use or functionality of the present technology. Neither should the computing environment 100 be interpreted as having any dependency or requirement relating to any one or combination of components illustrated in the exemplary computing system 100.

The present technology is operational with numerous other general-purpose or special-purpose computing system environments or configurations. Examples of well known computing systems, environments, and configurations that may be suitable for use with the present technology include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Overview

Devices such as scanners, printers and faxes are typically shared in offices for many reasons, including cost. The device market is slowly moving towards IP-enabled high-end devices which are networked and can be shared among many different computer systems on the network. These devices are considered "network enabled devices." A network enabled device may communicate, for example, via a standard called "Web Services for Devices" (WSD). It is appreciated, however, that any number of communication protocols could be used by a network enabled device to be shared and to communicate on a network. It is also appreciated that the communication protocol may be operating system specific. The communication protocol may include sub-protocols specific to a particular functionality such as printing, scanning, faxing and the like. Many operating systems include the software layer that enables a computer system to communicate with network-enabled devices.

The cost of network enabled devices is in most cases is greater than the cost for non-network enabled devices. For this reason and for other reasons, it may not be feasible to upgrade all non-network enabled devices to network enabled devices that communicate with a standard such as WSD. For example, in the home segment, many users may have non-network enabled devices that they want to share among a plurality of computer systems coupled to a home network. With the increase of networking technology and the decrease in cost of networking equipment, many home users have networks in their homes and are unable to share non-network enabled devices over the network.

Embodiments of the present technology for enabling routing of data on a network based on a portion of data accessed from a non-network enabled device enable routing of data from a non-network enabled device coupled to a first computer system on a network to a second computer on the network. As such, the present technology enables data to be routed through a non-network enabled device as if it had the functionality of a network enabled device. In one embodiment, data is routed from a non-network enabled device coupled to a first computer system on a network to a second computer system on the network without storing a copy of the data on the first computer system. In one embodiment, data is automatically routed based on a destination address identified from a scanned document or data file.

In one embodiment, a non-network enabled device is emulated as a network enabled device so that data can be routed from the non-network enabled device to the network as if the device were actually a network enabled device. This enables legacy devices that would not normally be able to route data to a network to function as if they were network enabled devices.

It is appreciated that embodiments of the present technology can be used in any number of ways. For example, in one embodiment, a non-network enabled device can be accessed by a remote computer system on a network. In another embodiment, data can be routed from a non-network enabled device to a remote computer system on the network. In short, embodiments of the present technology can be used to enable a non-network enabled device to operate as if it were a network enabled device.

Figure 2:
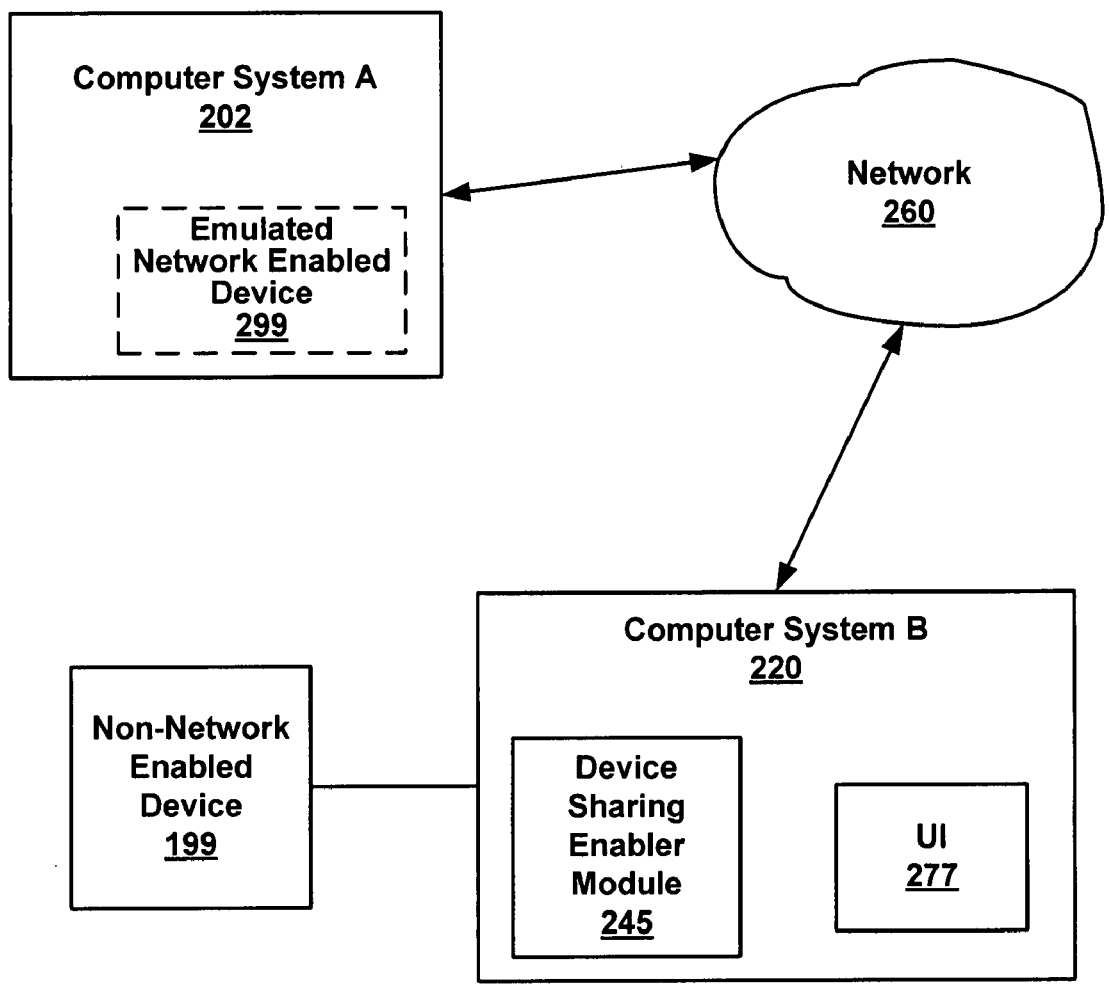
FIG. 2 is a diagram of an exemplary system for sharing a non-network enabled device over a network in accordance with embodiments of the present technology for enabling routing of data on a network based on a portion of data accessed from a non-network enabled device.

In one embodiment, the present technology is used with non-network enabled devices that are capable of working in both "push" and "pull" scenarios. For example, a scanner "push event" is generated by the first computer system coupled with the scanner to the second computer system and that in action performs a "pull" event Architecture FIG. 2 is a diagram of an exemplary system for sharing a non-network enabled device 199 over a network 260 in accordance with embodiments of the present technology for enabling sharing of devices on a network. As stated above, embodiments of the present technology enable the non-network enabled device 199 to be shared with computer system A 202 even though the non-network enabled device 199 is locally coupled to computer system B 220 and would not normally be able to be shared on the network 260.

The device sharing enabler module 245 provides a communication interface between the non-network enabled device 199 and computer system A 202 that enables the non network enabled device 199 to behave as if it were a network enabled device. In one embodiment, data can be routed from the non-network enabled device to the network using the local computer system coupled to the non-network enabled device as a communication interface between the non-network enabled device and other computer systems on the network.

It should be appreciated that the device sharing enabler module 245 could be a software module or a hardware module. For purposes of brevity and clarity, the components of the device sharing enabler module described as functional blocks and it is appreciated that any number of functional blocks described in conjunction with the device sharing enabler module 245 could implemented in either software or hardware in accordance with the present technology for enabling routing of data on a network based on a portion of data accessed from a non-network enabled device.

In one embodiment, the device sharing enabler module 245 enables an emulated network enabled device 299 to be visible and/or accessible to computer system A 202. The emulated network enabled device 299 functions as if it were actually a network enabled device from the perspective of computer system A 202. It is appreciated that the emulated network enabled device 299 is an emulation of the non-network enabled device 199, as shown by the dotted lines.

In other words, from a user standpoint at computer system A 202, there wouldn't be a perceived difference between using the emulated network enabled device 299 or an actual network enabled device coupled to the network 260. In one embodiment, computer system B 220 serves as a communication interface between the non-network enabled device and computer system A 202.

In addition, a user at computer system B 220 could route data through the non-network enabled device 199 to computer system A 202 using computer system B 220 as a communication interface between the non-network enabled device 199 and computer system A 202. In one embodiment, a user interface 277 local to computer system B 220 is used to route data via the non-network enabled device 199 to computer system A 202 without actually storing a copy of the data at computer system B 220. By not storing a copy of the data at computer system B 220, security is improved since unwanted copies are not generated and stored at computer system B 220.

It is appreciated that any number of computer systems may be coupled to network 260. For brevity and clarity, FIG. 2 shows the non-network enabled device 199 shared between two systems (computer system A 202 and computer system B 220). However, it is appreciated that the present technology for enabling routing of data on a network is well suited for routing data from non-network enabled devices to a network with any number of computer systems on any number of different networks.

In one embodiment, the non-network enabled device 199 communicates via a first communication protocol while the computer system A 202 communicates via a second communication protocol which may be different from the first communication protocol. For example, the computer system A 202 may communicate by a protocol that is associated with communication between network enabled devices such as WSD, as described above. In contrast, the non-network enabled device 199 may communicate via a protocol that is associated with communication between non-network enabled devices, for example, a device driver interface communication protocol which may or may not be specific to the non-network enabled device 199.

To resolve the differences in communication protocols, the device sharing enabler module may convert communication of the first protocol to communication of the second protocol and vice versa. By converting the communications between the two protocols, the computer system A 202 is enabled to share the non-network enabled device 199.

For purposes of brevity and clarity, the device sharing enabler module 245 is illustrated as being part of computer system B 220. It is appreciated that the device sharing enabler module could also be an intermediary device or software layers between computer system B 220 and the non-network enabled device 199.

Figure 3:
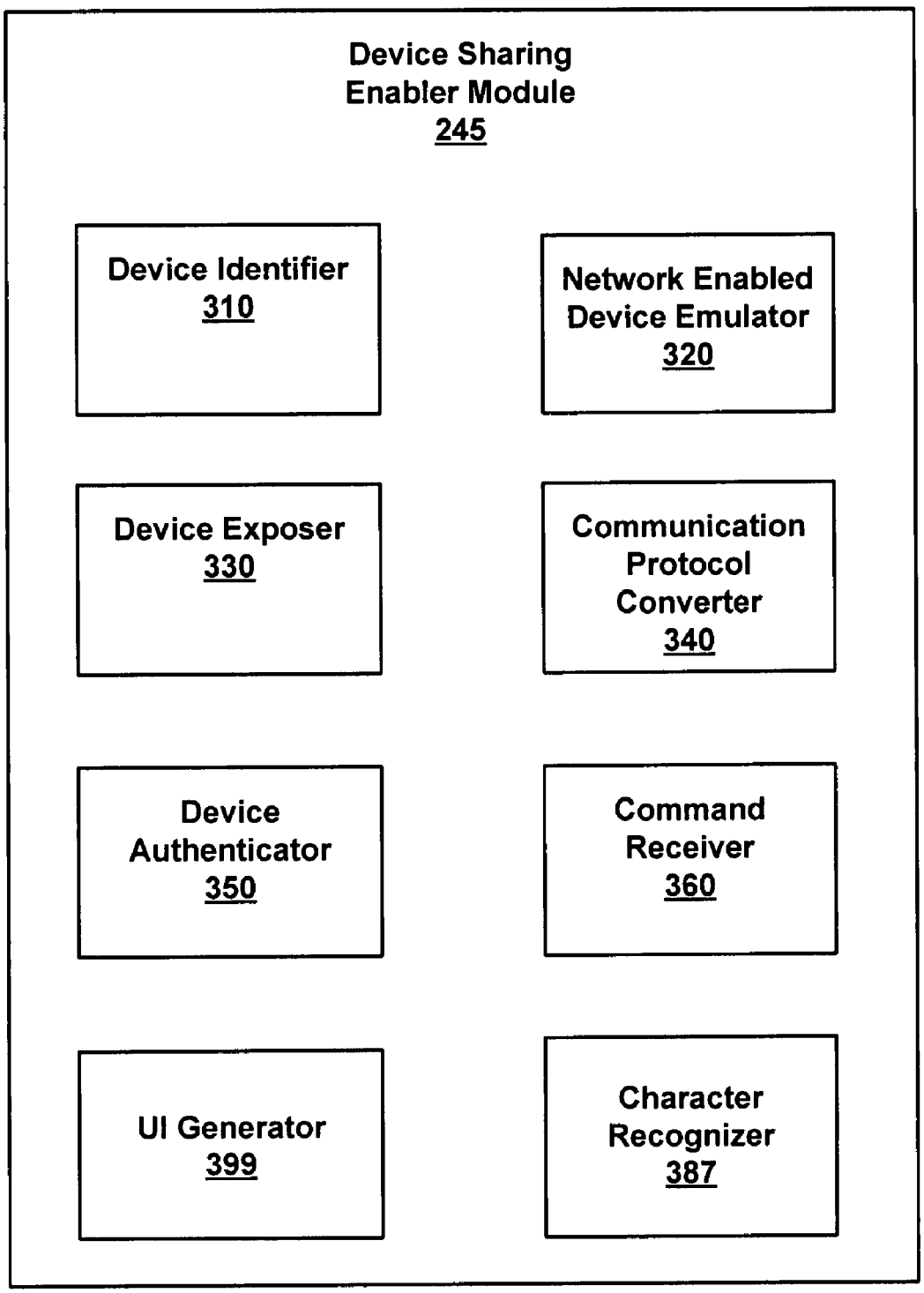
FIG. 3 is an illustration of an exemplary device sharing enabler module in accordance with embodiments of the present technology for enabling routing of data on a network based on a portion of data accessed from a non-network enabled device.

FIG. 3 is an illustration of an exemplary device sharing enabler module 245 in accordance with embodiments of the present technology for enabling sharing of devices on a network. In one embodiment, the device sharing enabler module 245 includes a device identifier module 310 for identifying a non-network enabled device. For example, the device identifier module 310 identifies non-network enabled device 199 of FIG. 2.

In one embodiment, the device identifier module 310 may access information associated with any identified devices. For example, the device identifier module 310 may access information such as device driver information, communication protocol information, etc. It is appreciated that the device identifier module 310 may access information associated with the identified device(s) directly from the identified device(s), from the computer system the device is locally coupled to or any other source, such as network 260 of FIG. 2.

In one embodiment, the device sharing enabler module 245 may also include a network enabled device emulator module 320. The network enabled device emulator module 320 may be configured to enable sharing of a non-network enabled device on a network. In one embodiment, the network enabled device emulator module 320 emulates a network enabled device that can be exposed to computer systems on a network such that a non-network enabled device can be shared on the network. In one embodiment, a device exposer module 330 exposes the emulated network enabled version of the non-network enabled device to the network and enables sharing of a non-network enabled device to at least one computer system coupled to the network but is not directly coupled to the non-network enabled device.

In one embodiment, the device sharing enabler module enables a user to route data from a non-network enabled device coupled with a first computer system to a second computer systems on the network. In one embodiment, the data can be routed through the first computer system without actually storing a copy of the data on the first computer system. In essence, the present technology enables a non-network enabled device to behave and operate as if it were a network enabled device.

As described above, the device sharing enabler module 245 can be utilized as a communication interface between a network and a non-network enabled device such that the non-network enabled device can be shared with other computer systems on the network. In one embodiment, a communication protocol converter 340 is configured to convert a communications between the non-network enabled device and other computer systems that share the device over the network.

In one embodiment, the communication protocol converter 340 converts communication that is associated with network enabled communications to communication that is associated with non-network enabled communications and vice-versa. In other words, the communication protocol converter 340 enables sharing of a non-network enabled device on a network by enabling seamless communication between the non-network enabled device and computer systems on the network communicating with the non-network enabled device even though they may be communicating via different protocols. In short, the communication protocol converter 340 translates between a plurality of communication protocols so that the devices can communicate via different protocols seamlessly which enables sharing of a non-network enabled device on a network.

In one embodiment, a computer system attempting to share a non-network enabled device on a network may need to be authenticated prior to gaining access to the non-network enabled device. In one embodiment, a device authenticator module 350 authenticates a computer system prior to sharing the non-network enabled device on the network. In one embodiment of the invention, the device authenticator module 350 communicates with the device exposer 330 and prevents the device exposer 330 from exposing devices prior to successful authentication.

In another embodiment, authentication is not performed. In this embodiment, a user does not have access to the first computer and hence also does not have access to the user interface at the computer system coupled to the non-network enabled device. In this case, without a user interface, the user relies on the device sharing enabler module to automatically determine a destination address of a scanned document, for example, based on a destination address written or printed on a cover sheet, for example.

In this embodiment, since the destination address is automatically discovered from the document itself, the user does not need to have permissions or access to the computer system the non-network enabled device is coupled to. This enabled users to share a non-network enabled device on a network without requiring extra security measures such as an authentication interface at the computer system coupled with the non-network enabled device and without requiring that the user have permission to access the computer system coupled with the non-network enabled device. This permission would mean permission to ALL the resources with that computer system. With this automatic detection, the user has access only to the non-network enabled device that is being shared.

In one embodiment, the authenticator module authenticates a user at a first computer system prior to allowing the user access a non-network enabled device coupled to the first computer system. After authentication, the user can route data from the non-network enabled device to a second computer system on the network as if they were using a network enabled device.

As stated previously, a non-network enabled device can be shared on a network and be controlled by a computer system on the network that is not locally coupled to the non-network enabled device in accordance with the present technology. In one embodiment, a graphical user interface associated with the computer system on the network that is not locally coupled to the non-network enabled device can be used to generate command instructions for controlling the non-network enabled device shared over the network. A graphical user interface as such is described in conjunction with FIGS. 4A, and 5.

In one embodiment, the command instructions are received by a command receiver module 360. The command receiver module 360 may send the command instructions to the communication protocol converter 340 so that the command instructions are converted to a protocol understood by the non-network enabled device. In one embodiment, the command receiver receives command instructions from a character recognizer 387.

In one embodiment, the device sharing enabler module includes a user interface generator 399 for generating a user interface local to a computer system coupled locally to a non-network enabled device. In one embodiment, the user interface enables control of the non-network enabled device from the first computer system and enables routing of data from the non-network enabled device to a second computer system on the network. It is appreciated that embodiments of the present technology are also well suited for systems that do not include a user interface.

In one embodiment, the present technology enables automatic routing of data from a non-network enabled device to a network. In one embodiment, the destination address is identified from data input at the non-network enabled device. For purposes of brevity and clarity, a scanner device is used as an example of a non-network enabled device. In this example, the destination address for routing data is identified from a scanned document. For example, the destination address is recognized from a header portion of a cover page. In one embodiment, OCR is performed to identify the destination address.

The device sharing enabler module may include a character recognizer 387 for recognizing a destination address from data accessed from the non-network enabled device. In the case of the scanner, the character recognizer recognizes a destination address from a portion of a scanned document, for example. In one embodiment, a user does not have access to a user interface at the computer system coupled with the non-network enabled device and relies on the device sharing enabler module to recognize a destination address from a portion of the document.

The present technology automatically recognizes a routing destination from a scanned document. However, it is appreciated that embodiments of the present technology are also well suited for automatically identifying a routing destination from any number of data, including scanned documents as well as any other data type, file or such.

For purposes of brevity and clarity, the modules (310, 320, 330, 340, 350, 360, 387, and 399) of the device sharing enabler module 245 are presented as being part of the device sharing enabler module 245 as an example. However, it is appreciated that the configuration of the device sharing enabler module 245 could be different, for example, one or more of the modules may reside outside the device sharing enabler module 245. It is also appreciated that the modules of FIG. 3 could also be one or more software modules that can be used by a computer operating system or application to enable routing of data on a network.

Figure 4A:
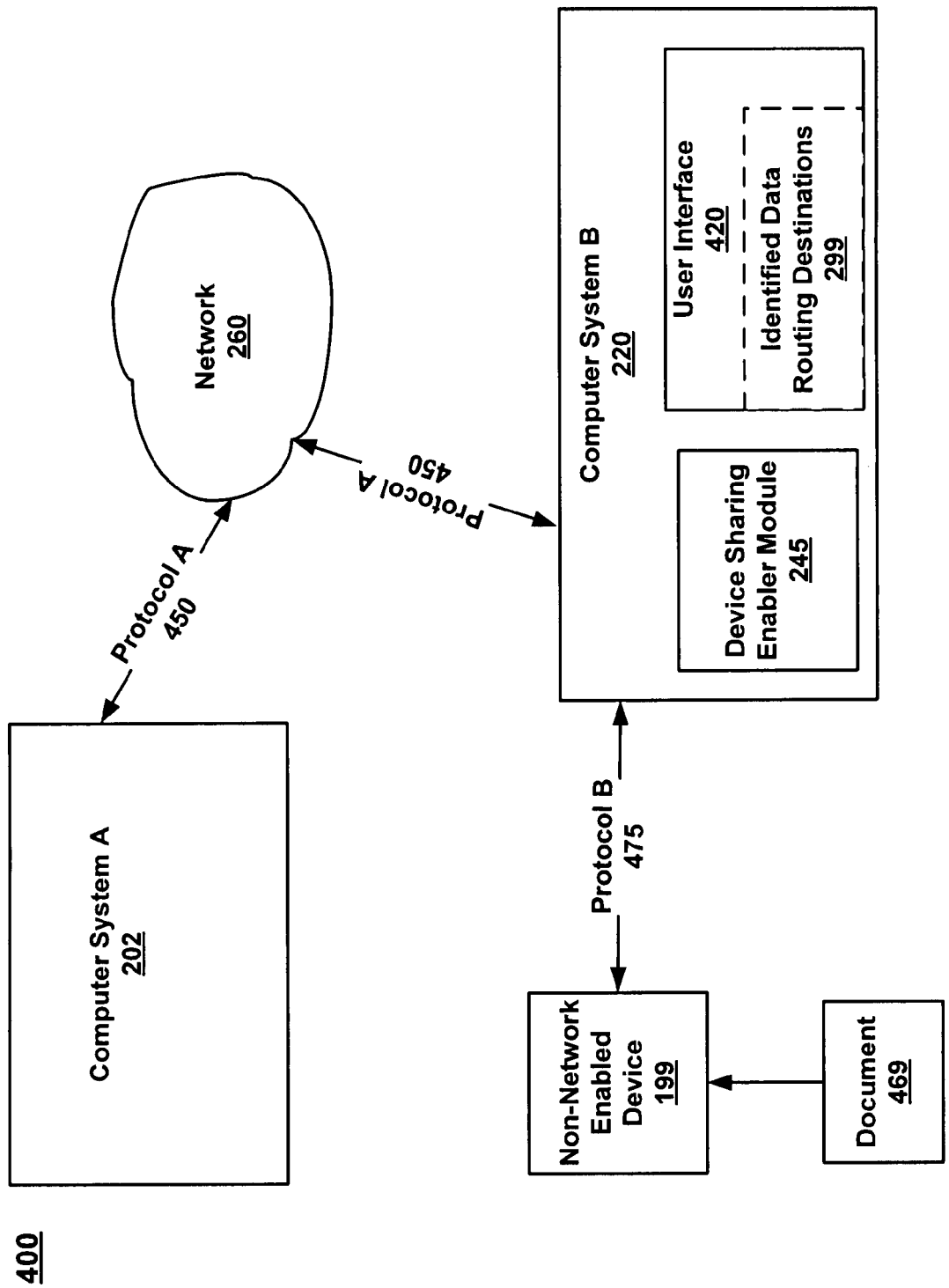
FIG. 4A is an illustration of an exemplary system for enabling routing of data on a network from a non-network enabled device by converting communication protocols in accordance with embodiments of the present technology for enabling routing of data on a network based on a portion of data accessed from a non-network enabled device.

FIG. 4A is an illustration of an exemplary system for enabling routing of data on a network 260 from a non-network enabled device 199 by converting communication protocols in accordance with embodiments of the present technology for enabling routing of data on a network based on a portion of data accessed from a non-network enabled device. In one embodiment, the computer system B 220 serves as a communication interface between computer system A 202 and the non-network enabled device 199 to enable sharing of the non-network enabled device 199 on network 260. In one embodiment, communication of protocol A 450 is converted to a communication protocol B 475. Converting between the protocols enables the non-network enabled device to operate as a network enabled device from the standpoint of computer system A 202.

In one embodiment, data can be routed from the non-network enabled device 199 to computer system A 202 using computer system B 220 as a communication interface. For example, in the case the non-network enabled device 199 is a scanner, scanned images can be routed directly from the scanner to computer system A 202.

It is appreciated that the present technology is well suited for systems without a user interface. However, in one embodiment, a user interface 420 associated with computer system B 220 is used to select computer system A 202 from a list of available data routing destinations 299. In one embodiment, the scanned images are not stored on computer system B 220 but are routed directly to computer system A 202. In one embodiment, data is automatically routed without a user interface.

In another embodiment, the scanned images are automatically routed to computer system A 202 based on a destination address identified 299 from a document 469. For example, the document 469 includes "computer system A" 202 in a header portion of the document. The device sharing enabler module 245 recognizes "computer system A" 202 from the header portion of the document 469 and automatically routes the scanned image of document 469 to computer system A 202 by using computer system B 220 as a communication interface between the non-network enabled device 199 and computer system A 202.

In one embodiment, "computer system A" 202 is displayed in a user interface 420 as the identified data routing destinations 299. In one embodiment, a user may select from one or more available data routing destinations.

In one embodiment, a user may need to be authenticated prior to being able to access the non-network enabled device from computer system B 220. For example, a log-in may be presented on user interface 420.

Figure 4B:
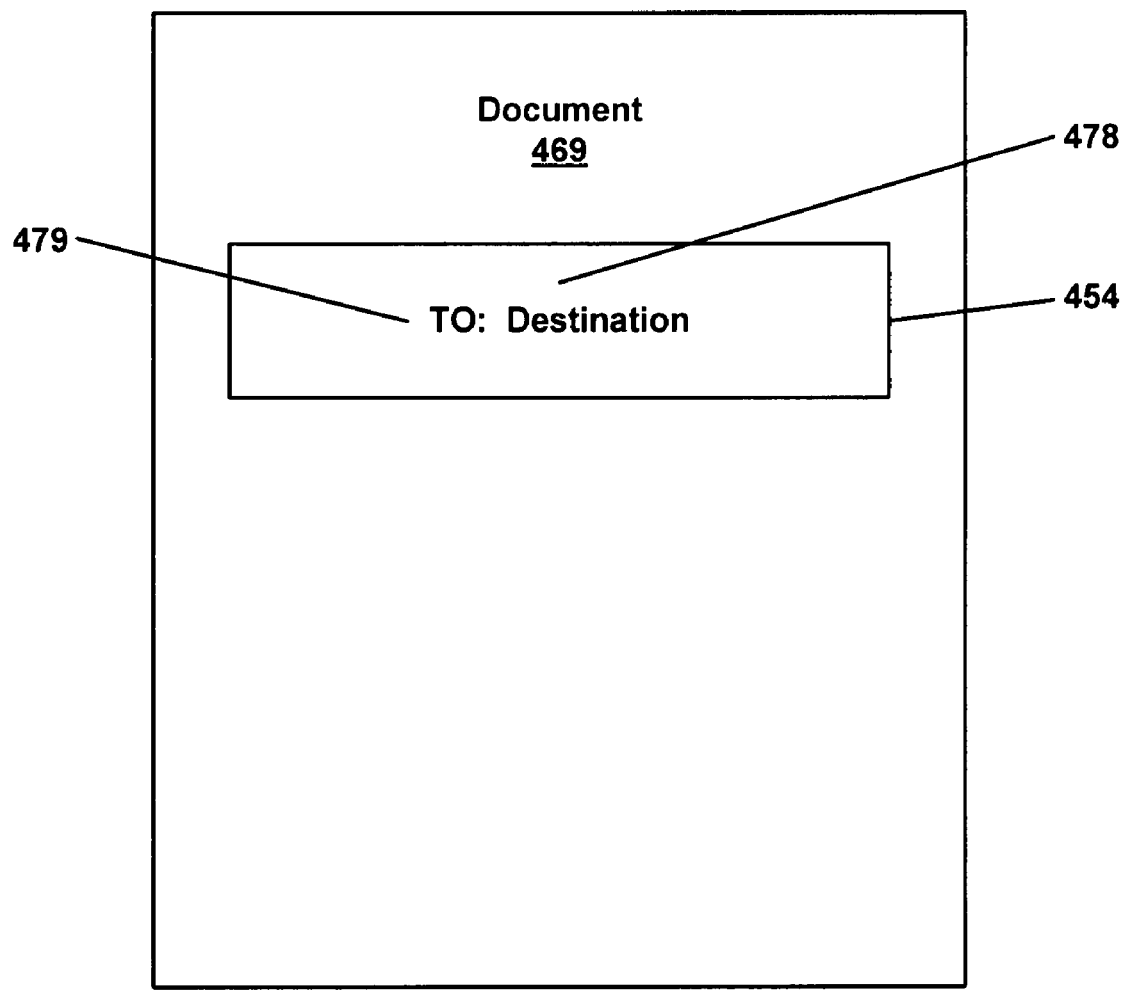
FIG. 4B is an illustration of an exemplary document comprising a destination address in accordance with embodiments of the present technology for enabling routing of data on a network based on a portion of data accessed from a non-enabled device.

FIG. 4B is an illustration of an exemplary document 469 comprising a destination address 478 in accordance with embodiments of the present technology for enabling routing of data on a network based on a portion of data accessed from a non-network enabled device. In one embodiment, a destination indicator 479 is used to alert the device sharing enabler module 245 from FIG. 4A that a destination address 478 is included in header portion 454 of document 469.

It is appreciated that the destination address 478 can be identified in any number of ways, including optical character recognition. It is appreciated that the destination 478 may be the actual "name" of a particular computer system on the network. It is also appreciated that the destination address 478 may be a coded name, for example, an identification number corresponding to an actual computer system on the network. It is appreciated that a look-up table may be needed to associate coded names to actual computer systems of the network. Various methods and systems for determining an actual destination address from a coded address are well known in the art and any number of these methods could be used in accordance with the present technology.

In one embodiment, the destination address 478 is recognized from a particular location or portion of the document 489, for example a header portion 454. However, it is appreciated that the destination address 478 could be recognized in any number of ways including identifying a destination address indicator 479 such as the word "to." For example, the word "to" could be recognized from the document 469 and the word following the word "to" is used to determine the data routing address. In another embodiment, a cover page is used to specify the destination address 478. In this embodiment, a user indicates the destination address by printing or writing the name of the computer system on the network that they want the scanned document routed to.

In one embodiment, in response to receiving a "blank" or "cover" page with just a destination address on it, the device sharing enabler module understands the intention to scan to a particular network destination. In addition, in response to receiving a blank or cover page with just a code on it, the device sharing enabler module understands the intention to scan to a particular network destination and perform a look-up to determine the correct destination address corresponding to the code on the page.

In one embodiment, the destination address is pre-printed on a separate page that can be coupled to the cover page of the document, for example, destination addresses can be pre-printed on labels that can be attached to a cover page. By doing so, the character recognizer may have an easier time identifying the destination address because character recognition errors would be reduced.

Figure 5:
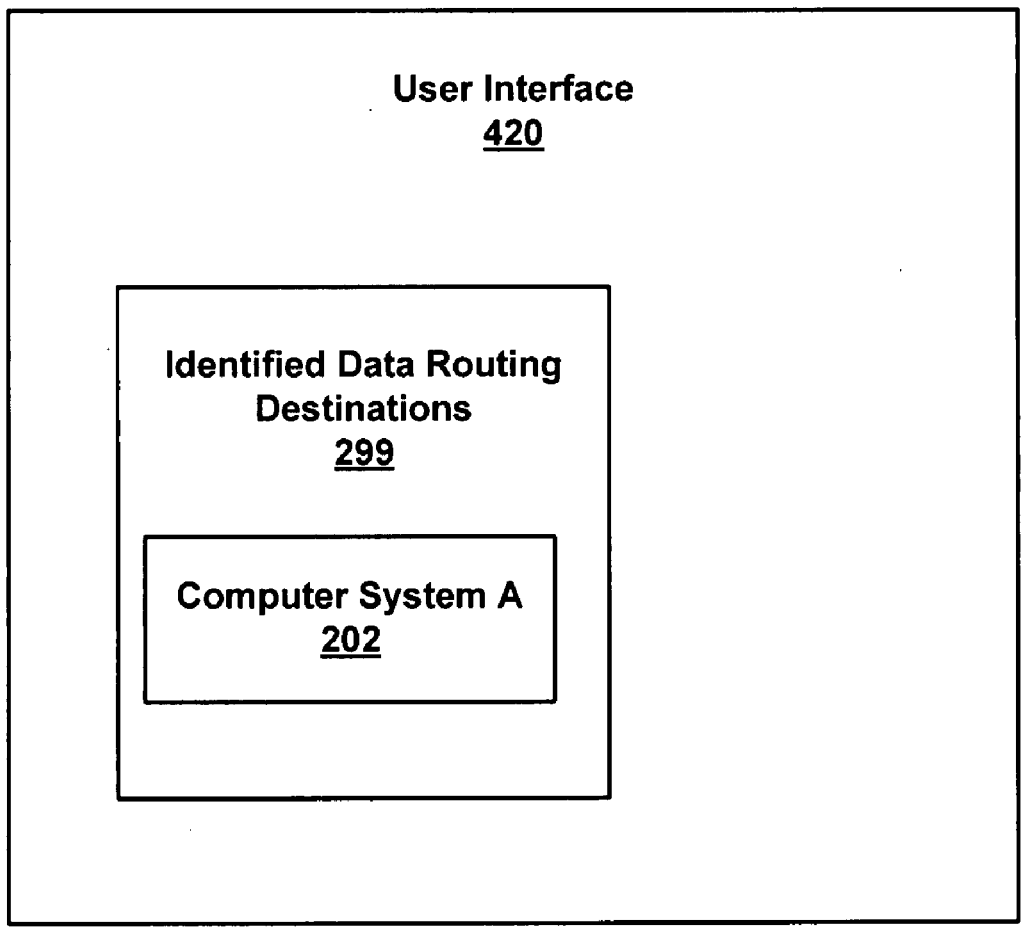
FIG. 5 is an illustration of an exemplary user interface for enabling routing of data on a network from a non-network enabled device in accordance with embodiments of the present technology for enabling routing of data on a network based on a portion of data accessed from a non-network enabled device.

FIG. 5 is an illustration of an exemplary user interface 420 for enabling routing of data from a non-network enabled device coupled to a first computer system on a network to a second computer system on the network. In this particular example, the non-network enabled device is coupled to computer system B 220. In response to recognizing computer system A 202 as a destination address from a scanned document, the computer system A 202 is available as a destination 299 for routing data from the non-network enabled device. Embodiments of the present technology enable routing of data to destinations on a network that would not normally be available when using a non-network enabled device.

Operation

Figure 6:
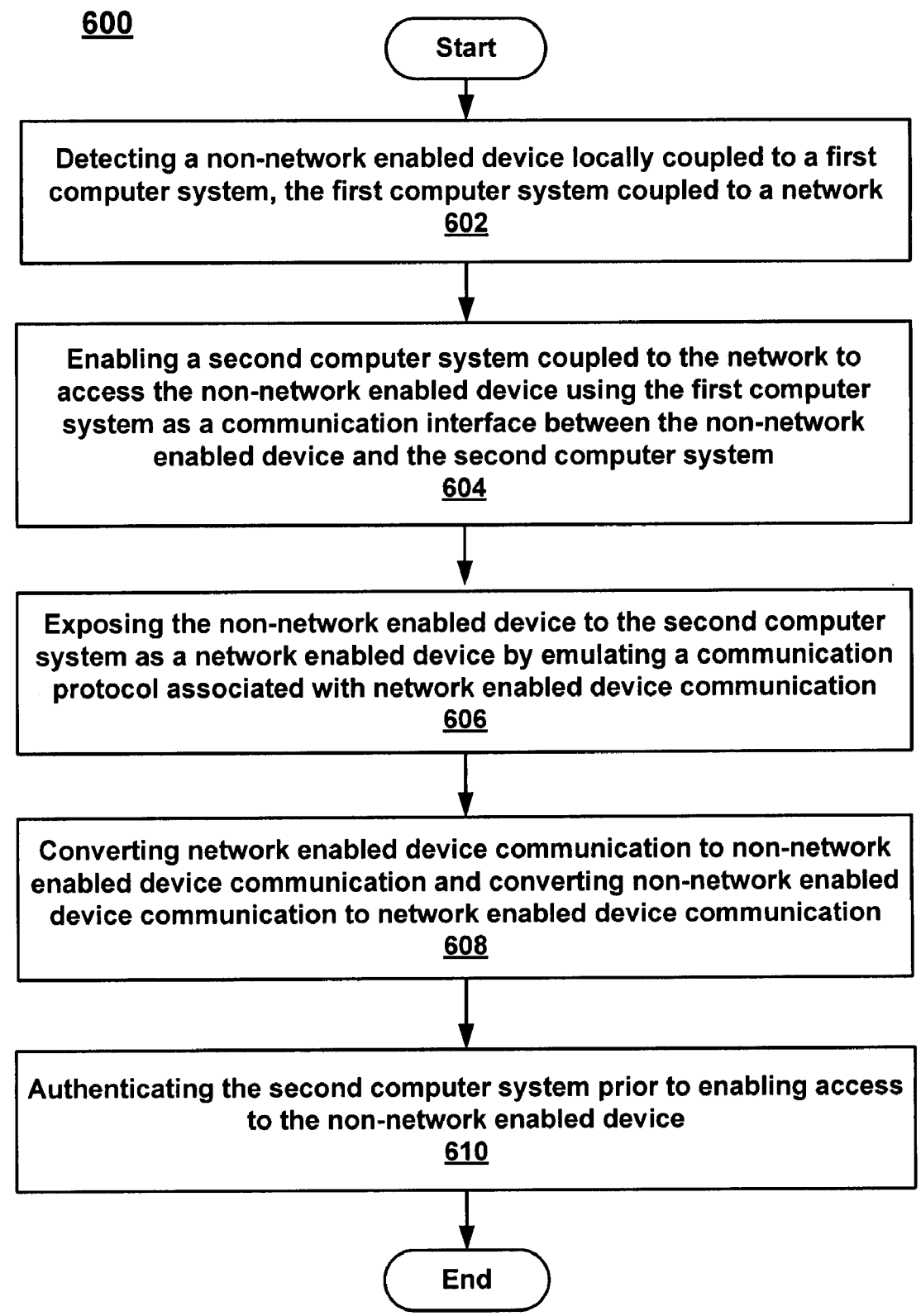
FIG. 6 is a flow diagram of an exemplary method for enabling routing of data on a network from a non-network enabled device in accordance with embodiments of the present technology for enabling routing of data on a network based on a portion of data accessed from a non-network enabled device.

FIG. 6 is a flow diagram of an exemplary method 600 for enabling routing of data on a network from a non-network enabled device in accordance with embodiments of the present technology for enabling routing of data on a network based on a portion of data accessed from a non-network enabled device.

At 602, method 600 includes detecting a non-network enabled device locally coupled to a first computer system wherein the first computer system is coupled to a network. In one embodiment, 602 includes determining device attributes associated with the non-network enabled device and/or device attributes associated with a second computer system coupled to the network that wants to share the non-network enabled device over the network.

At 604, method 600 includes enabling a second computer system coupled to the network to access the non-network enabled device by using the first computer system as a communication interface between the non-network enabled device and the second computer system. In one embodiment, a device sharing enabler module coupled to the first computer system performs 604.

At 606 the present technology exposes the non-network enabled device to the second computer system as a network enabled device by emulating a communication protocol associated with network enabled device communication. In one embodiment, a graphical representation of the non-network enabled device is provided to a user interface associated with the second computer system which can be graphically presented as an emulated network enabled device.

608 includes converting network enabled device communication associated with a first communication protocol to non-network enabled device communication associated with a second protocol. 608 can also include converting non-network enabled device communication to network enabled device communication. In one embodiment, the non-network enabled device communication protocol is associated with a device driver interface local to the first computer system and associated with the non-network enabled device.

At 610, method 600 includes authenticating the second computer system prior to enabling access to the non-network enabled device at 604.

It is appreciated that the various components of method 600 can be executed differently from how it is presented in FIG. 6. The order of method 600, as presented in FIG. 6 is intended to be provided as an example of enabling routing of data on a network from a non-network enabled device in accordance with the present technology for enabling routing of data on a network from a non-network enabled device.

Figure 7:
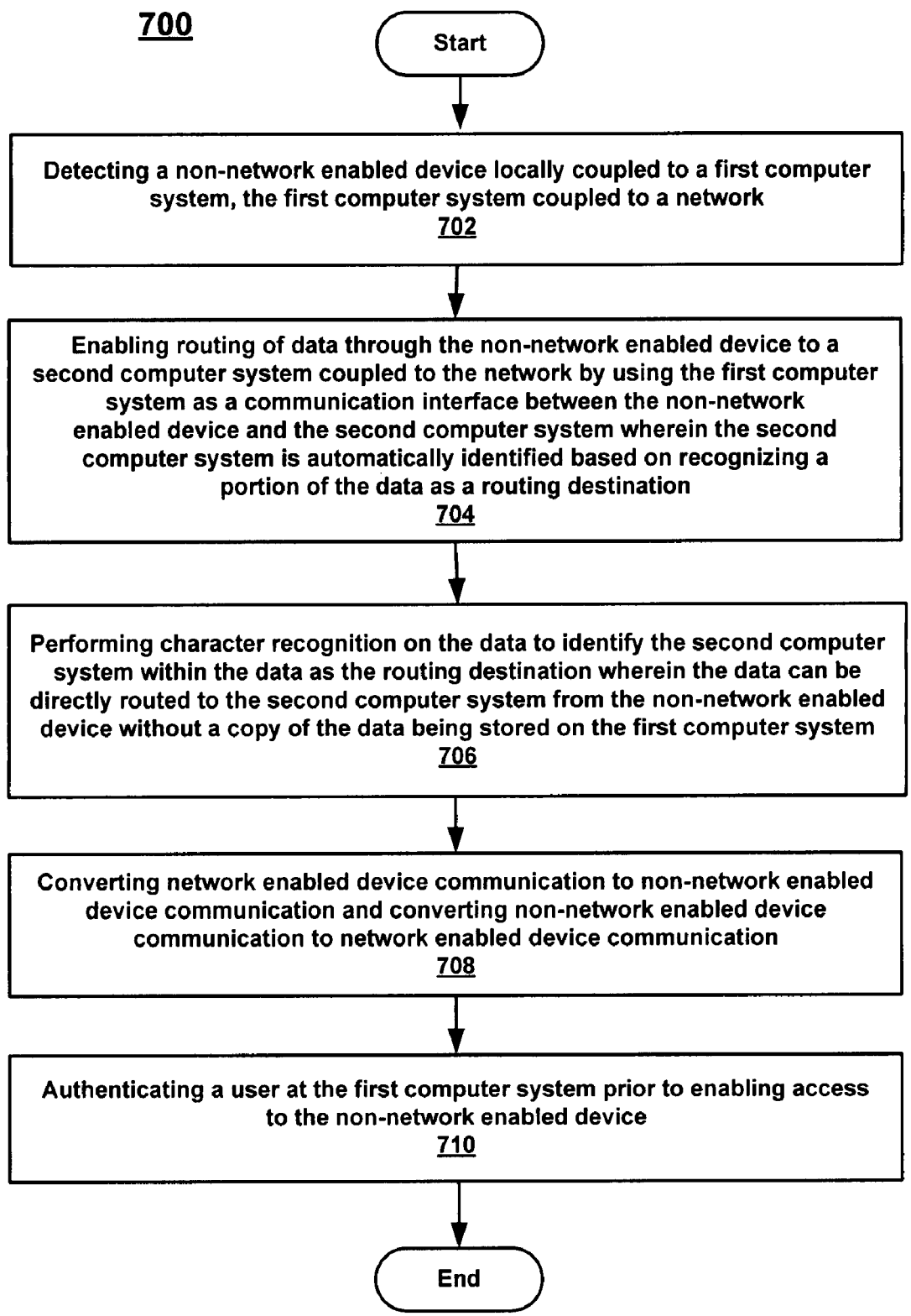
FIG. 7 is a flow diagram of an exemplary method for enabling routing of data on a network from a non-network enabled device in accordance with embodiments of the present technology for enabling routing of data on a network based on a portion of data accessed from a non-network enabled device.

Enabling Routing of Data on a Network Based on a Portion of Data Accessed from a Non-Network Enabled Device FIG. 7 is a flow diagram of an exemplary method 700 for enabling routing of data on a network from a non-network enabled device in accordance with embodiments of the present technology for enabling routing of data on a network based on a portion of data accessed from a non-network enabled device. In one embodiment, the present technology enables data to be automatically routed on a network using a non-network enabled device that would not normally be capable of doing so. In this embodiment, a locally coupled computer system is used as a communication interface to enable routing of data from a non-enabled device to a network.

At 702, method 700 includes detecting a non-network enabled device locally coupled to a first computer system wherein the first computer system is coupled to a network. In one embodiment, 702 includes determining device attributes associated with the non-network enabled device and/or device attributes associated with a second computer system coupled to the network that wants to share the non-network enabled device over the network.

At 704, method 700 includes enabling routing of data through the non-network enabled device to a second computer system coupled to the network by using the first computer system as a communication interface between the non-network enabled device and the second computer system wherein the second computer system is automatically identified based on recognizing a portion of the data as a routing destination. In one embodiment, a device sharing enabler module coupled to the first computer system performs 704. It is appreciated that the device sharing enabler module, or a portion of could be hardware, software or a combination of both.

At 706 the present technology performing character recognition on the data to identify the second computer system within the data as the routing destination wherein the data can be directly routed to the second computer system from the non-network enabled device without a copy of the data being stored on the first computer system. In one embodiment, a graphical representation of the second computer system is provided to a user interface associated with the first computer system. In one embodiment, data may be stored on the first computer system temporarily. However, in one embodiment, the data is removed when the operation is completed.

708 includes converting network enabled device communication associated with a first communication protocol to non-network enabled device communication associated with a second protocol. 608 can also include converting non-network enabled device communication to network enabled device communication. In one embodiment, the non-network enabled device communication protocol is associated with a device driver interface local to the first computer system and associated with the non-network enabled device.

At 710, method 700 includes authenticating a user at the first computer system prior to enabling access to the non-network enabled device at the first computer system.

It is appreciated that the various components of method 700 can be executed differently from how it is presented in FIG. 7. The order of method 700, as presented in FIG. 7 is intended to be provided as an example of enabling routing data from a non-network enabled device to a remote computer system on a network in accordance with the present technology for enabling routing of data on a network based on a portion of data accessed from a non-network enabled device.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer readable device comprising computer executable instructions that when executed on a computer via a microprocessor perform a method comprising:
   detecting a non-network enabled device locally coupled to a first personal computer system, said first personal computer system coupled to a network;
   enabling routing of data from said non-network enabled device to a second computer system coupled to said network by using said first personal computer system as a communication interface between said non-network enabled device and said second computer system without a copy of said data being stored on said first personal computer system, wherein said second computer system is automatically identified based on recognizing a portion of said data as indicating the second computer system is a routing destination; and
   performing character recognition on said data to identify said second computer system within said data as said routing destination, wherein said data can be directly routed to said second computer system from said non-network enabled device.

2. The computer readable device of claim 1, the non-network enabled device comprising a non-network enabled scanner, the data comprising a scanned page, a portion of the scanned page indicating that the second computer system is the routing destination.

3. The computer readable device of claim 1 wherein performing character recognition on said data enables a graphical user interface associated with said first personal computer system to identify said second computer system as said routing destination and to display a graphical representation of said second computer system as said data routing destination.

4. The computer readable device of claim 1, the method comprising:
enabling routing of said data from said non-network enabled device directly to said second computer system by emulating a communication protocol associated with network enabled device communication such that the second computer interacts with the non-network enabled device in a same manner as the second computer interacts with a network enabled device.

5. The computer readable device of claim 1, the method comprising:
converting non-network enabled device communication associated with a first communication protocol to network enabled device communication associated with a second protocol.

6. The computer readable device of claim 1, the method comprising accessing at least one of driver information and communication protocol information associated with the non-network enabled device from the non-network enabled device.

7. A method for routing data comprising a scanned page from a non-network enabled scanner on a network, said method executed via a processor on a computer having a memory whereon computer executable instructions comprising the method are stored, said method comprising:
identifying said non-network enabled scanner locally coupled to a first computer system, said first computer system coupled to said network; and
enabling routing of said data from said non-network enabled scanner to a second computer system coupled to said network by using said first computer system as a communication interface between said non-network enabled scanner and said second computer system without a copy of said data being stored on said first computer system, wherein said second computer system is automatically identified based on recognizing a location of said scanned page as indicating the second computer system is a routing destination.

8. The method of claim 7 comprising:
performing character recognition on said data to identify said second computer system within said data as said routing destination, wherein said data can be directly routed to said second computer system from said non-network enabled scanner.

9. The method of claim 7 wherein a header of the scanned page comprises the location of the scanned page indicating the second computer system is the routing destination.

10. The method of claim 7 comprising:
enabling routing of said data from said non-network enabled scanner directly to said second computer system by emulating a communication protocol associated with network enabled scanner communication.

11. The method of claim 7 comprising:
converting non-network enabled scanner communication associated with a first communication protocol to network enabled scanner communication associated with a second protocol.

12. The method of claim 7, comprising accessing at least one of driver information and communication protocol information associated with the non-network enabled scanner from the first computer system.

13. In a computing device, a system comprising a device sharing enabler module configured to facilitate routing of data from a non-network enabled device on a network, said device sharing enabler module comprising:
a device identifier module configured to identify said non-network enabled device locally coupled to the device sharing enabler module, the device sharing enabler module locally coupled to a first personal computer system, said first personal computer system coupled to said network; and
a network enabled device emulator module configured to facilitate routing of said data from said non-network enabled device to a second computer system coupled to said network by using said first personal computer system as a communication interface between said non-network enabled device and said second computer system without a copy of said data being stored on said first personal computer system, wherein said second computer system is automatically identified based on recognizing a portion of said data as indicating the second computer system is a routing destination, at least some of one or more of the device sharing enabler module, device identifier module, and network enabled device emulator module implemented at least in part with a microprocessor.

14. The device sharing enabler module of claim 13 comprising:
a data character recognizer module configured to perform character recognition on said data to identify said second computer system within said data as said routing destination, wherein said data can be directly routed to said second computer system from said non-network enabled device.

15. The device sharing enabler module of claim 14 wherein said data character recognizer module enables a graphical user interface associated with said first personal computer system to identify said second computer system as said routing destination and to display a graphical representation of said second computer system as said data routing destination.

16. The device sharing enabler module of claim 13 comprising:
a communication protocol converter module configured to enable routing of said data from said non-network enabled device directly to said second computer system by emulating a communication protocol associated with network enabled device communication such that the second computer interacts with the non-network enabled device in a same manner as the second computer interacts with a network enabled device.

17. The device sharing enabler module of claim 16 configured such that said communication protocol associated with network enabled device communication is emulated from communication associated with a device driver interface protocol that is local to said first personal computer system and also associated with said non-network enabled device.

18. The device sharing enabler module of claim 13, the non-network enabled device comprising a non-network enabled scanner, the data comprising a scanned page, a portion of the scanned page indicating that the second computer system is the routing destination.

19. The device sharing enabler module of claim 18, the portion of the scanned page determined based at least in part on a destination indicator comprising a plurality of predetermined alphanumeric characters.

20. The device sharing enabler module of claim 13, the device identifier module configured to access at least one of driver information and communication protocol information associated with the non-network enabled device from a third computer system coupled to the network, the third computer system not the same as the first personal computer system, the third computer system not the same as the second computer system.

* * * * *

UNITED STATES PATENT AND TRADEMARK OFFICE
CERTIFICATE OF CORRECTION

PATENT NO. : 8,107,469 B2  Page 1 of 1
APPLICATION NO. : 11/724383
DATED : January 31, 2012
INVENTOR(S) : Manoj K. Jain et al.

It is certified that error appears in the above-identified patent and that said Letters Patent is hereby corrected as shown below:

In column 2, line 36, after "non-" insert -- network --.

Signed and Sealed this
Twenty-seventh Day of March, 2012

David J. Kappos
*Director of the United States Patent and Trademark Office*